United States Patent [19]
Beck

[11] Patent Number: 6,003,661
[45] Date of Patent: Dec. 21, 1999

[54] ROLLER CONVEYOR AND SUPPORTING ROLLER

[75] Inventor: Rüdiger Beck, Adelsheim, Germany

[73] Assignee: Bleichert Forderanlagen GmbH, Osterburken, Germany

[21] Appl. No.: 08/942,812

[22] Filed: Oct. 2, 1997

[30] Foreign Application Priority Data

Oct. 8, 1996 [DE] Germany .............. 196 41 317

[51] Int. Cl.⁶ .................................................. B65G 13/07
[52] U.S. Cl. ....................................................... 198/790
[58] Field of Search ........................................... 198/790

[56] References Cited

U.S. PATENT DOCUMENTS

| | | | |
|---|---|---|---|
| 4,343,396 | 8/1982 | George | 198/790 X |
| 4,361,224 | 11/1982 | Bowman | 198/790 X |
| 4,416,650 | 11/1983 | Wilkins | 474/161 |
| 5,147,024 | 9/1992 | Yamada | 198/790 X |
| 5,148,909 | 9/1992 | Becker et al. | 198/790 X |
| 5,586,639 | 12/1996 | Yoshino | 198/790 X |

FOREIGN PATENT DOCUMENTS

| | | | |
|---|---|---|---|
| 0 009 508 | 9/1978 | European Pat. Off. . | |
| OS 28 38 974 | 6/1973 | Germany . | |
| OS 25 33 113 | 7/1975 | Germany . | |
| OS 23 28 206 | 7/1978 | Germany . | |
| GM 86 34 166 | 12/1986 | Germany . | |
| 37 11 697 | 7/1987 | Germany . | |
| 39 42 594 A1 | 12/1989 | Germany . | |
| 41 26 822 A1 | 8/1991 | Germany . | |
| 788892 | 1/1958 | United Kingdom . | |
| 1 514 767 | 6/1978 | United Kingdom | F16C 13/00 |

Primary Examiner—William E. Terrell
Assistant Examiner—Kenneth W Bower
Attorney, Agent, or Firm—Nilles & Nilles SC

[57] ABSTRACT

A roller for a roller conveyor which has an integral base body (3) made of thermoplastic which is symmetric to an axis of rotation (9) and which contains a through passage (11) coaxial to the axis of rotation and is defined by two face sides (7, 8). The roller has a flanged pulley (4) integral to the base body (3) which is coaxial to the axis of rotation, a covering (34) arranged on the supporting section (5) which forms a running surface for work pieces or work piece supports, a tooth arrangement (45) constructed on the driving section (6) for at least one drive means active in a positive-locking manner, and bearings (17, 18, 29) arranged in the through passage (11) for rotatable support of the roller (1) on a shaft member (48).

36 Claims, 3 Drawing Sheets

ROLLER CONVEYOR AND SUPPORTING ROLLER

BACKGROUND OF THE INVENTION

A roller conveyor is known from DE 41 26 822 A1 which serves to convey work pieces, or work pieces or skids fastened to work piece supports to a processing station. The roller conveyor has longitudinal supports running adjacent and parallel to one another, by means of which and between which a plurality of supporting rollers is rotatably mounted.

In one of the embodiments shown, each supporting roller has a tubular hub rotatably mounted on the shaft member by means of ball bearings and having an external tooth arrangement. The hub is made of light metal and bears two attached flanged pulleys containing a corresponding internal tooth arrangement in order to create a rotationally fixed connection with the hub. A tubular polyurethane covering, which on the surface of its internal periphery also contains an internal tooth arrangement corresponding to the hub, sits between the flanged pulleys. The assembly is secured in axial direction by retaining rings.

The covering of the supporting rollers is subject to wear since the work pieces and work piece supports transported with such roller conveyors in actual fact have a weight of up to four tons, which means that forces of up to half a ton act on the driving elements. Correspondingly high lateral guiding forces must be applied by the flanged pulley which has the task of laterally guiding the work piece support.

Considerable wear occurs on the covering and the flanged pulleys as a result of the operating conditions.

Moreover, because of the relatively narrow face with which they lie on the hub, high forces occur at the hole of the flanged pulley if the work piece support runs against the flanged pulley. This also has a detrimental effect on the period of service of the flanged pulley and thus on the entire supporting roller.

Moreover, production is expensive because of the many individual parts from which the supporting roller is assembled.

A further embodiment for a conveyor roller is shown in EP 0 009 508 A1. In this conveyor roller, the support section, the flanged pulley and the driving section are integrally connected to one another. The unit thus formed sits rotationally fixed on a shaft member, i.e. without a tooth arrangement, as shown in the figure. This means a press-fit connection with the shaft member, which is, however, only durable if both the shaft member and the roller are made of metal. There is no covering.

A support roller for conveyor belts is described in DE-GM 86 34 166. This support roller comprises a hub and a covering fastened to the surface of the outer periphery of the hub. The hub itself is an injection moulded part made of a thermoplastic plastic, onto which the covering or shell is injected.

The connection between the hub and the shell, which is made of rubber, is positive because of the corresponding structure of the outer contour of the hub.

The support roller is not provided to be actively driven.

OBJECTS AND SUMMARY OF THE INVENTION

On this basis, the object of the invention is to provide a roller for a roller conveyor, which may be simply produced and has an improved service life.

This object is achieved according to the invention by the roller with the features in claim 1.

The new supporting roller is produced as an integral plastic moulded part which is symmetrical with respect to the axis of rotation. In spite of the use of plastic for the base body, it is possible to withstand high loads with the new roller. The flanged pulley connected in one piece with the base body has an improved service life, since the connection with the "hub" is firmer and is no longer a plug-in connection with internal tooth arrangement.

The roller can be produced in an appropriately more favourable manner as a series product without adaptations having to be made to the respective application case.

For the case where the base body is made of a material which is not necessarily suitable for pairing with the material of the work piece or work piece support running over it, the base body can be provided with a covering on the first section. This covering is advantageously connected positively to the base body and/or integrally with the material thereof.

The combination of material and positive connection is particularly advantageous when the material for the covering is relatively soft and there is the risk of the connection between the covering and the base body separating or of the covering shifting as a result of flexing movements of the covering, which occur when the work pieces and work piece supports run over it. The positive connection allows the part adhered to the material to be moved into regions remote from the flexing movements, e.g. by constructing the grooves, with which the positive connection is created, as T-grooves in the base body. The adhesive connections between the covering and the base body are protected from flexing movements in the undercuts of the T-grooves, so that there is no risk of detachment. On the other hand, the covering cannot shift on the base body since the strip-like extensions of the injection moulded covering projecting into the grooves hold the covering permissibly firmly on the base body.

Moreover, the tooth arrangement for driving the supporting rollers by means of a motor can also be worked directly into the base body, so that no further production steps after the original moulding of the base body are necessary here.

The tooth arrangement is expediently constructed as a tooth arrangement for toothed belts, whereby two toothed belts, which couple the respective supporting roller to the respective adjacent drive system, or to a drive system, under some circumstances circulate around the second section of each roller. A separating ring is provided on the tooth arrangement so that these toothed belts do not destroy one another. The separating ring can either be in one piece with the second section or is subsequently attached, whereby it is advantageously connected with the base body against rotation.

The through hole, which passes through the base body and through which the rigid shaft member is inserted for support of the roller, is expediently simultaneously constructed as a seat for bearing means. In the simplest case, these bearing means are roller bearings, in particular ball bearings, and this guarantees a particularly easy movement.

The roller can be constructed so as to receive two or three roller bearings depending on the load conditions. In the base of high loads, two roller bearings may be housed respectively on the two axial ends of the first section, which constitutes the running surface for the work pieces, and a third roller bearing is located at the end of the second section. In the case of light applications, the middle roller bearing can shift below the centre of the tooth arrangement, while the third roller bearing is omitted.

The toothed face is preferably defined in axial direction by shoulders so that the toothed belts, which drive the roller or are driven by them, do not shift away in axial direction. One of the shoulders can be constructed in one piece with the base body, while the other shoulder is part of a subsequently attached end or flanged pulley. The end pulley is positively connected to the base body, i.e. by means of a tubular extension which is inserted into the base body. If this tubular extension is simultaneously constructed as a bearing seat, the inserted bearing can fix the locking connection between the tubular extension and the base body.

Further developments of the invention form the subject of the sub-claims.

BRIEF DESCRIPTION OF THE DRAWINGS

An embodiment of the subject of the invention is shown in the drawing.

DESCRIPTION OF THE PREFERRED EMBODIMENTS

Figure 1:
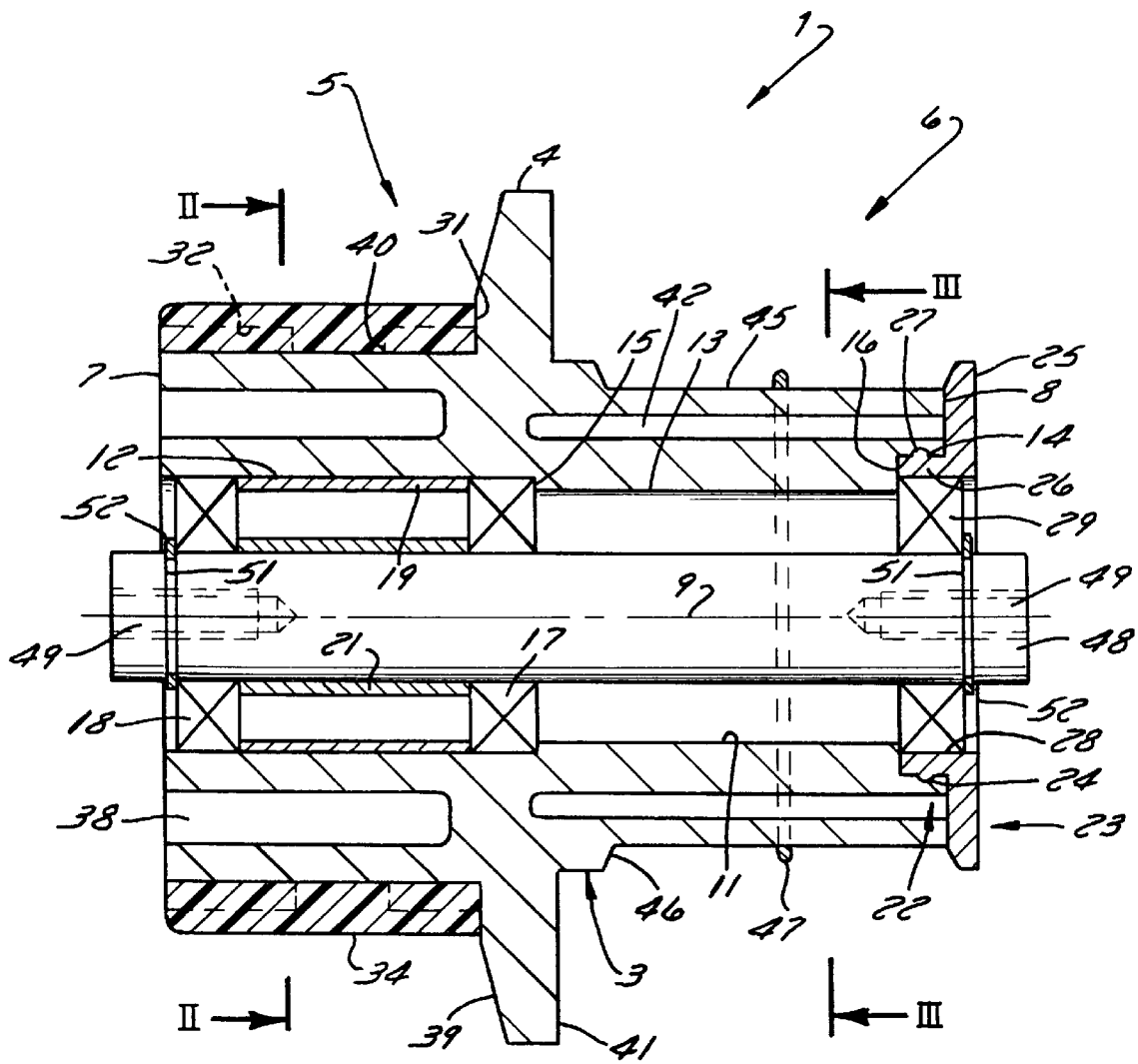
FIG. 1 shows a roller for a roller conveyor in a longitudinal section.
Figure 2:
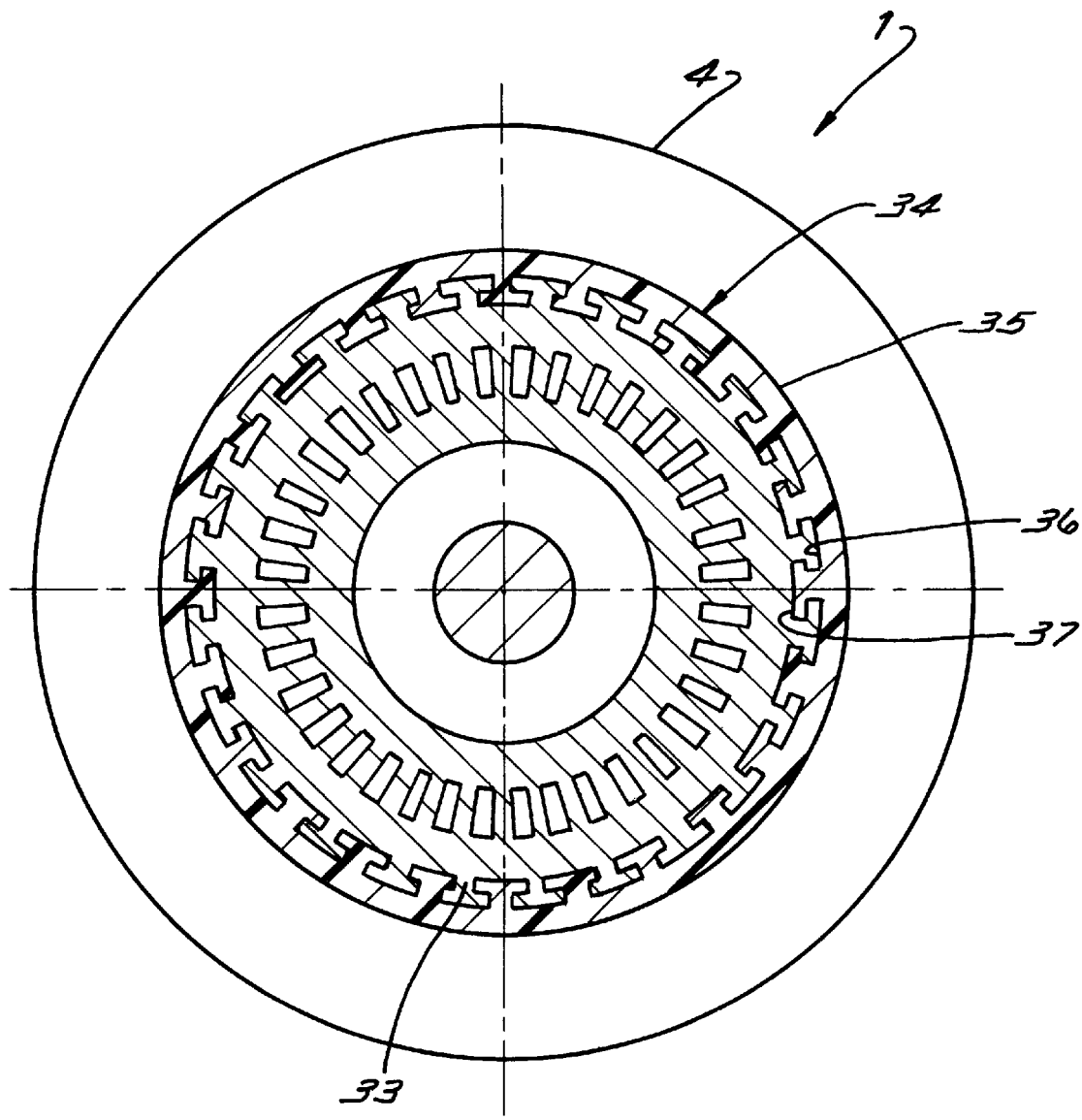
FIG. 2 shows the roller according to FIG. 1 in section along line II—II in FIG. 1.
Figure 3:
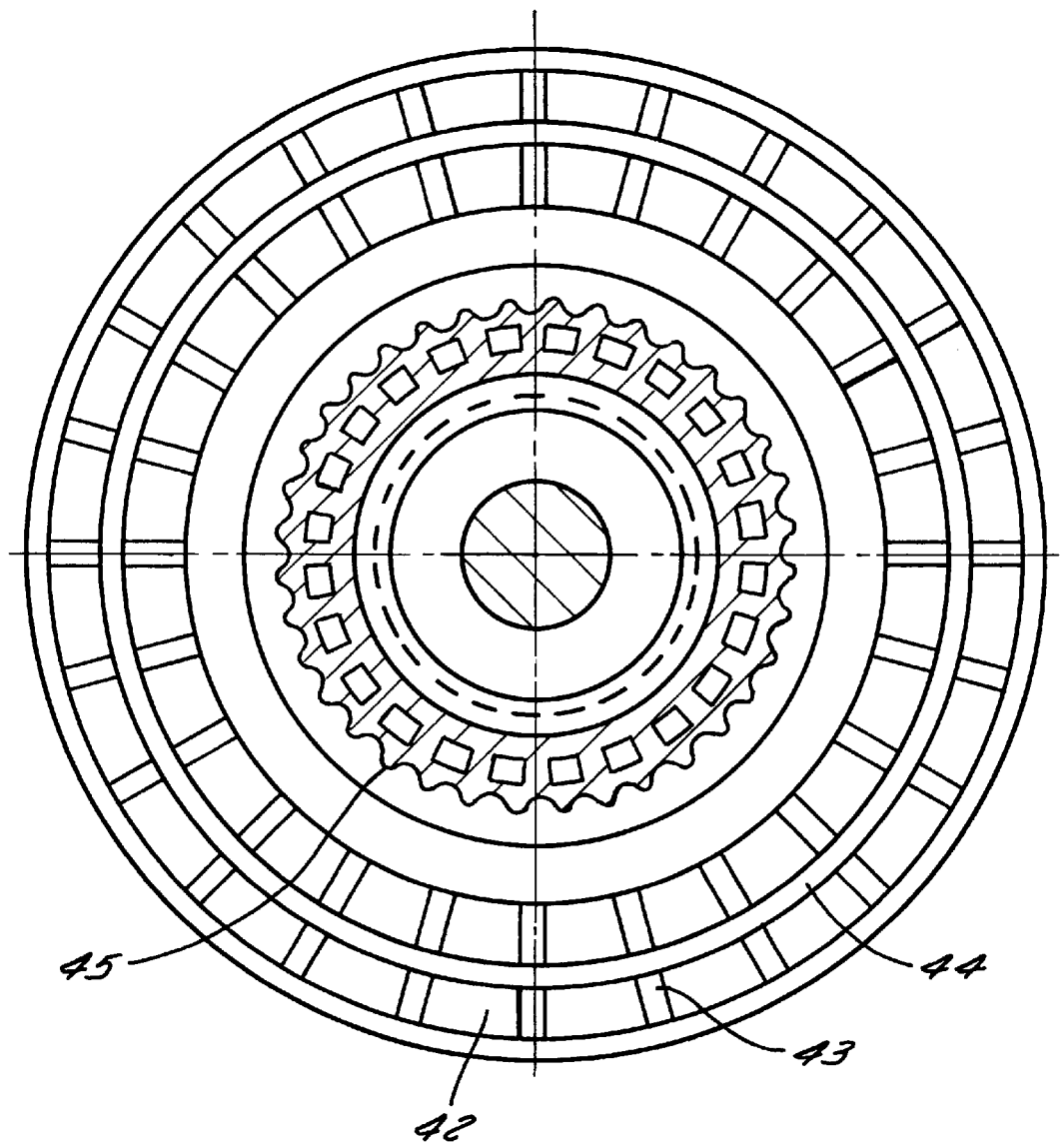
FIG. 3 shows the roller according to FIG. 1 in section along line III—III in FIG. 1.

FIGS. 1 to 3 show a supporting roller 1 in various sectional views which, together with further identically structured supporting rollers, is provided in a roller conveyor or skid system. The support roller 1 comprises a plastic injected base body 3, which is divided into a supporting or running section 5 and a driving section 6 by a flanged pulley 4. The base body 3 is an essentially cylindrical or tubular structure, which is restricted on the end side by two plane faces 7 and 8. The base body 3 is rotationally symmetric relative to an axis of rotation 9 and has a through hole 11 passing through it which is coaxial to the axis of rotation 9.

The through hole 11 is composed overall of three sections of different diameter, namely one section 12, which begins at the face 7, one section 13, and one section 14, which begins at face 8, whereby sections 12 and 14 merge into section 13 lying between them at plane annular shoulders 15 and 16, said section 13 having a smaller width than the cylindrical section 12 or the cylindrical section 14.

The cylindrical section 12 serves to receive two deep groove ball bearings 17 and 18, which are inserted into the cylindrical section 12 at their external bearing rings. In this case, the deep groove ball bearing 17 abuts against the circumferential annular shoulder 15 at its external bearing ring. The space between the two deep groove ball bearings 17 and 18 is assured by two spacer sleeves 19 and 21 having the same length, or only by one spacer sleeve 19. Spacer sleeve 19 abuts against the wall of the cylindrical section 12 and supports the two deep groove ball bearings 17 and 18 in the region of the external bearing rings, while spacer sleeve 21 acts between the internal bearing rings of the two deep groove ball bearings 17 and 18.

The cylindrical section 14 forms a part of a snap or catch connection 22, with which an end pulley 23 of the base body 3 is locked. For this, the cylindrical section 14 contains a circumferential semi-circular groove 24 directed in peripheral direction.

The end pulley 23 comprises a plane, essentially flat circular disc 25, which is provided on its side facing the base body 3 with a tubular extension 26 and projects radially above the driving section 6. The circular disc 25 can also be injected in one piece on the base body 3. However this incurs higher tool costs.

The tubular extension 26 has a length, measured from the rear side of the end pulley 23, corresponding to the length of the cylindrical section 14, while its outside diameter is equal to the width of the cylindrical section 14. On its outer peripheral face, the cylindrical extension 26 bears a circumferential rib 27 directed in peripheral direction which is complementary to the groove 24 and engages in a locked arrangement into the rib 27 in assembled state. Thus, the rib 27 with the tubular extension 26 constitutes the other part of the catch connection 22.

A cylindrical through passage 28 with a diameter equal to the diameter of the cylindrical section 12 of the through hole 11 is directed through the tubular extension 26 and the circular disc 25. A third deep groove ball bearing 29 sits in this cylindrical through passage 28. It abuts at its external bearing ring against the radially inward projecting part of the annular shoulder 16, since the diameter of section 13 is smaller than the diameter of the through passage 28, as stated.

The supporting section 5 extends from the face 7 as far as a plane annular shoulder 31 of the flanged pulley 4. As the cross-section in FIG. 2 shows, its cylindrical outside peripheral face 32 is an essentially cylindrical outside face which is coaxial to the axis of rotation 9. It contains a plurality of T-shaped grooves 33 of identical structure, which are evenly spaced along the length of the outside peripheral face 32 and extend parallel to the axis of rotation 9. A cover 34 made of polyurethane or a comparable wear-resistant plastic material is injected onto this outside peripheral face 32 thus structured with T-grooves 33. The covering 34 forms a smooth cylindrical outside face 25, itself coaxial to the axis of rotation 9, provided to act as supporting or running surface for the work pieces, work piece supports or skids running over it. The covering 34 has a Shore hardness A of approx. 95.

To additionally obtain axial shear of the covering 34 on the outside peripheral face 32, a groove 40 with rectangular cross-section runs around the outside peripheral face 32, the depth of said groove corresponding to the depth of the T-grooves 33. The groove 40 is located approximately in the centre of the outside peripheral face 32 relative to its axial extension.

Because of the manner of application of the covering 34, namely by injection moulding, an inner side 36 results on the covering 34 which constitutes a mould of the outside peripheral face 32 as well as the T-grooves 33 contained therein. The covering 34 is at the same time provided with a plurality of equally spaced, T-shaped ribs 37, which are made of the same material as the covering 34 and positively connect the covering 34 to the supporting section 5.

In addition to the positive connection between the covering 34 and the supporting section 5, an integral material connection is advantageously also provided in which a material pairing for the covering 34 and the base body 3 is used which allows an integral material connection when the covering 34 is injection moulded. For the case where it is not possible to provide a direct integral material connection, the base body 3 is provided in the region of the supporting section 5, i.e. on the outside peripheral face 32 and the T-grooves 33, with a coupling agent in order to create the desired integral material connection when the covering 34 is injection moulded.

The outside diameter of the covering 34 corresponds approximately to the outside diameter of the plane shoulder 31.

To render the base body 3 lighter in the region of the supporting section 5 and to save the use of unnecessary material, the supporting section contains a plurality of blind openings 38, which are spaced equally on a circle concentric to the axis of rotation 9. The depth of the blind openings 38 corresponds approximately to the width of the covering 34.

The flanged pulley 4 located between the supporting section 5 and the driving section 6 merges into an even conical surface 39 in the adjoining area to the plane annular shoulder 31. As FIG. 1 shows, the inner deep groove ball bearing 17 sits approximately in the region of the flanged pulley 4, i.e. on the end of the supporting section 5 adjacent to the flanged pulley 4.

The flanged pulley 4 is defined in the direction towards the driving section 6 by the plane face 41, in which recesses 42 are inserted, so that a plurality of radially extending ribs 43 and ribs 44 running in peripheral direction are formed on the plane face 41, as FIG. 3 shows. As a result, there is a saving in material in the region of the flanged pulley 4 without having an undesirable effect on its rigidity.

The driving section 6 bears an external tooth arrangement 45, which begins at the inclined annular shoulder 46 adjacent to the flanged pulley 4. The tooth arrangement 45 extends continuously from the inclined shoulder 46 as far as the face 7. The structure of the tooth arrangement 45 is such that it can cooperate with an appropriately complementary toothed belt.

Since the driving section 6 is provided for the circulation of two endless toothed belts, its axial length is appropriately dimensioned, and in additional it bears, preferably against rotation, a separating ring 47, which engages into the tooth arrangement 45. The separating ring 47 can be either mounted to float freely in axial direction on the tooth arrangement 45 or it is injected in one piece with the base body 3. The cylindrical shaft member 48 passes through the concentric deep groove ball bearings 17, 18 and 29 and is provided with threaded blind holes 49 on the end side. To permit axial shear of the supporting roller 1 on the shaft member 48, two locking grooves 51 are stamped into it, with retaining rings 52 snapping into them which abut from the outside against the internal bearing rings of the two outer ball bearings 18 and 29. As may be seen, the shaft member 48 projects over the supporting roller 1 or the end pulley 23 on both-sides.

Finally, in order to save the use of unnecessary material for the base body, the supporting section 5 may also be provided with a plurality of blind openings 53 which are arranged equally spaced on a circle concentric to the axis of rotation 9. They are arranged at a corresponding radial distance from the tooth arrangement 45 so as not to have a detrimental effect on the radial rigidity of the tooth arrangement 45, and are parallel to the axis of rotation 9.

The supporting roller 1 described so far is produced by the base body 3 being firstly injected in one piece in a corresponding form. If necessary, the supporting section 5 is then provided with a coupling agent in the region of the T-grooves 33 as well as the remaining outside peripheral face 32. The thus prepared base body 3 is brought into a second injection mould, in which the covering 34 is injected to assure the desired material connection and positive anchorage of the covering 34 to the supporting section 5.

If the softening temperature of the covering 34 is higher than the softening temperature of the base body 3, production is carried out necessarily in the reverse sequence.

Parallel to this, the end pulley 23 is also injection moulded from thermoplastic material.

After the separating ring 47 is attached, the end pulley 23 is inserted into the thus prepared base body 3, whereby it locks into the groove 24 with its rib 27. The subsequently inserted ball bearing 29 supports the extension 26 from the inside so that the snap connection between the rib 27 and the groove 24 can no longer be released. Finally, the ball bearings 17 and 18 are threaded onto the shaft member 48 with the two spacer sleeves 19 and 21 located between them, whereby said shaft member is already provided with the retaining ring 52 at one end. The structure thus prepared is inserted into the base body 3 until the configuration shown in FIG. 1 is achieved. The retaining ring 52 is then inserted on the side of the ball bearing 29, whereupon the supporting roller 1 is completely assembled.

A roller for the roller conveyor comprises a base body injection moulded in one piece from plastic, which is divided in longitudinal direction into a supporting section and a driving section. A covering, whose outside face constitutes the actual running surface, is located on the supporting section. The covering is connected directly by the material and/or positively connected to the base body so that it does not shift on the base body as a result of occurring flexing movement. The driving section is constructed to receive two toothed belts. The length of the roller is dimensioned so that the roller is restricted on one side of the roller conveyor or, in other words, the supporting roller has only a single running surface, as a result of which it may be universally used irrespective of the width of the roller conveyor. Moreover, assembly is very simple.

What is claimed is:

1. A roller for a conveyor comprising:
   an injection molded integral roller body comprised of a thermoplastic or thermoset plastic having an axial bore and an axis of rotation;
   a flange carried by the roller body that separates the roller body into a running section disposed toward one side of the flange and a driven section disposed toward another side of the flange;
   a shaft received in the axial bore in the roller body that is rotatively supported by a plurality of spaced apart roller bearings; and
   a cap disposed at one end of the roller body having a generally axially extending tubular extension received in the axial bore and retained therein by engagement of the tubular extension with the roller body and a radial flange disposed adjacent an axial end of the roller body wherein one of the roller bearings is disposed between the tubular extension and the shaft.

2. A roller for a conveyor comprising:
   an injection molded roller body of one piece and unitary construction made of a thermoplastic or thermoset plastic having an axial bore and an axis of rotation about which the roller body can rotate during operation, the roller body having a radially outwardly extending an integral flange that separates the roller body into a running section disposed on one side of the flange and a driven section disposed on another side of the flange, the running section having an outer peripheral surface with a plurality of pairs of spaced apart and generally axially extending grooves therein, and the driven section constructed and arranged to receive an endless flexible member;
   an injection molded covering encasing the outer peripheral surface of the running section of the roller body and received in the grooves in the outer peripheral surface interlocking the covering with the outer peripheral surface of the running section and bonding the covering with the outer peripheral surface of the running section;

a shaft received in the axial bore in the roller body with the roller body rotatively carried by the shaft; and wherein the driven section of the roller body, the running section of the roller body, and the integral flange of the roller body are molded integral as one piece.

3. The roller of claim 2 wherein the covering is injection molded around the entire outer peripheral surface of the running section of the roller body.

4. The roller of claim 2 wherein the outer peripheral surface of the driven section has a plurality of pairs of axially extending teeth.

5. The roller of claim 2 further comprising a plurality of pairs of axially spaced bearings operably carried by the shaft that rotatively support the roller body wherein a first one of the bearings is disposed adjacent one end of the roller body, a second one of the bearings is disposed adjacent an opposite end of the roller body, and a third one of the bearings is disposed between the first one of the bearing and the second one of the bearings.

6. The roller of claim 5 wherein the covering is comprised of polyurethane.

7. The roller of claim 5 wherein the one of the bearings axially underlies the integral flange.

8. The roller of claim 5 further comprising a cap having a generally axially extending tubular extension received in the axial bore in the roller body with one of the bearings disposed between the tubular extension and the shaft wherein the cap is retained in the axial bore by a snap connection such that the tubular extension engages the roller body.

9. The roller of claim 8 wherein the cap is disposed adjacent the driven section of the roller body.

10. The roller of claim 5 wherein the roller body has a plurality of sets of the grooves with one of the sets of the grooves being axially spaced from another one of the sets of the grooves to prevent the covering from moving axially relative to the body.

11. The roller of claim 10 wherein the covering is bonded to the outer peripheral surface by a coupling agent.

12. Roller for a roller conveyor comprising:

an integral base body made of a thermoplastic or a thermosetting plastic, which is essentially symmetric with respect to an axis of rotation having a through passage coaxial to the axis of rotation and which is defined by two face sides;

a flanged pulley integral to the base body, which divides the base body along the axis of rotation into a supporting section having an outer peripheral surface with a plurality of grooves in the outer peripheral surface that extend generally parallel to the axis of rotation and at least one driving section, and which is coaxial to the axis of rotation;

a covering arranged on the supporting section, of which the cylindrical outside face coaxial to the axis of rotation forms a running surface for work pieces or work piece supports, the covering bonded to the supporting section and interlocked with the grooves;

a tooth arrangement in operable cooperation with the driving section for being driven, and bearing means arranged in the through passage for rotatable support of the roller on a shaft member.

13. Roller according to claim 12, wherein the covering is connected integrally with the material of the supporting section.

14. Roller according to claim 12, wherein each of the grooves run parallel to the axis of rotation.

15. Roller according to claim 12, characterised in that in the region of at least one of the supporting section and the driving section, the base body contains blind openings, which are arranged on a circle concentric to the axis of rotation and which lead into the base body from the respective face which is directly adjacent to the respective section.

16. Roller according to claim 12, wherein the base body only has a single supporting section and a single driving section.

17. Roller according to claim 12, wherein the base body is fitted for support on a rotationally fixed shaft.

18. Roller according to claim 12, wherein each of the grooves have undercuts.

19. Roller according to claim 18, wherein each of the grooves is T-shaped.

20. Roller according to claim 12, further comprising an axial locking means provided for axially retaining the covering on the base body.

21. Roller according to claim 20, characterised in that the axial locking means is formed by at least one circumferential groove in the base body or the covering.

22. Roller according to claim 12, further comprising a separating ring carried by the driving section.

23. Roller according to claim 22, wherein the separating ring is can move axially relative to the driving section.

24. Roller according to claim 22, wherein the separating ring is rotationally fixed on the driving section.

25. Roller according to claim 22, wherein the separating ring is integral to the driving section.

26. Roller according to claim 13, wherein the bearing means comprise roller bearings.

27. Roller according to claim 26, wherein three of the roller bearings are provided.

28. Roller according to claim 26, wherein one of the roller bearings is located next to the face adjacent to the supporting section.

29. Roller according to claim 26, wherein one of the roller bearings is located adjacent the flanged pulley in such a manner that it supports the roller in the region of the flanged pulley.

30. Roller according to claim 26, wherein one of the roller bearings is located next to the face adjacent to the driving section.

31. Roller according to claim 12, wherein the driving section further comprises an annular shoulder disposed in an axial direction adjoining the tooth arrangement.

32. Roller according to claim 31, wherein one of the annular shoulders is constructed on an end pulley, which is connected to the base body.

33. Roller according to claim 32, characterised in that the end pulley is positively connected to the base body.

34. Roller according to claim 32, wherein the end pulley is locked to the base body.

35. Roller according to claim 32, further comprising a cylindrical, tubular extension which sits in the through passage in the end pulley.

36. Roller according to claim 35, wherein the bearing means is located in the cylindrical extension of the end pulley.

* * * * *